(12) United States Patent
Maruyama

(10) Patent No.: US 7,316,374 B2
(45) Date of Patent: Jan. 8, 2008

(54) FASTENERS FOR ATTACHING PIPES TO A SUPPORT

(75) Inventor: Toshio Maruyama, Toyohashi (JP)

(73) Assignee: Newfrey LLC, Newark, DE (US)

( * ) Notice: Subject to any disclaimer, the term of this patent is extended or adjusted under 35 U.S.C. 154(b) by 139 days.

(21) Appl. No.: 10/973,382

(22) Filed: Oct. 27, 2004

(65) Prior Publication Data

US 2005/0095082 A1    May 5, 2005

(30) Foreign Application Priority Data

Oct. 30, 2003    (JP)    ............................. 2003-370668

(51) Int. Cl.
*F16B 37/06*    (2006.01)
*F16L 3/22*    (2006.01)

(52) U.S. Cl. ........................ 248/68.1; 248/71; 411/429; 411/372.6; 411/522

(58) Field of Classification Search ................ 411/429, 411/372.5, 372.6, 372.3, 522; 248/68.1, 248/71

See application file for complete search history.

(56) References Cited

U.S. PATENT DOCUMENTS

| | | | | |
|---|---|---|---|---|
| 1,937,197 | A | * | 11/1933 | Halladay ..................... 293/102 |
| 2,413,087 | A | * | 12/1946 | Urbany .......................... 169/61 |
| 2,605,387 | A | * | 7/1952 | Brodie ......................... 362/220 |
| 2,797,720 | A | * | 7/1957 | Mann .......................... 411/175 |
| 2,878,905 | A | * | 3/1959 | Langermeier ................ 403/11 |
| 3,457,823 | A | * | 7/1969 | Dillon ....................... 411/366.1 |
| 3,894,706 | A | * | 7/1975 | Mizusawa ................... 248/68.1 |
| 4,037,810 | A | * | 7/1977 | Pate ........................... 248/68.1 |
| 4,659,273 | A | * | 4/1987 | Dudley ........................ 411/373 |
| 4,705,244 | A | * | 11/1987 | Saotome et al. ........... 248/68.1 |
| 4,787,793 | A | * | 11/1988 | Harris ........................ 411/339 |
| 5,033,701 | A | * | 7/1991 | Kraus ........................ 248/68.1 |
| 5,271,587 | A | * | 12/1993 | Schaty et al. .............. 248/68.1 |
| 5,538,377 | A | * | 7/1996 | Stewart et al. .............. 411/174 |
| 5,697,745 | A | * | 12/1997 | Shaw .......................... 411/258 |
| 5,752,795 | A | * | 5/1998 | D'Adamo ................... 411/429 |
| 6,070,836 | A | * | 6/2000 | Battie et al. ................ 248/68.1 |
| 6,089,513 | A | * | 7/2000 | Cau et al. ................... 248/68.1 |
| 6,135,691 | A | * | 10/2000 | Nadarajah et al. .......... 411/431 |

(Continued)

FOREIGN PATENT DOCUMENTS

JP    UM 60-73987    5/1985

(Continued)

*Primary Examiner*—Katherine Mitchell
(74) *Attorney, Agent, or Firm*—Miles & Stoxkbridge P.C.

(57) ABSTRACT

A fastener for a pipe is able to prevent an end of a stud to which the fastener is attached from puncturing a fuel tank or breaking other parts of a car body and causing the fuel tank to rupture when a collision occurs. The fastener comprises a fastener main body and a protective member. The fastener main body has a base, pipe fastening portions connected to the base, and a stud engaging portion connected to at least one of the base and the pipe fastening portions to engage a stud extending from a support. The stud engaging portion has a stud receiving hole for receiving the stud. A protective member is attached to at least one of the stud engaging portion and the base to cover the end of a stud in the stud receiving hole and has sufficient rigidity to prevent the end of the stud from protruding out of the stud receiving hole.

5 Claims, 7 Drawing Sheets

U.S. PATENT DOCUMENTS

| | | | |
|---|---|---|---|
| 6,217,090 B1 * | 4/2001 | Berzinji | 293/132 |
| 6,290,201 B1 * | 9/2001 | Kanie et al. | 248/636 |
| 6,450,459 B2 | 9/2002 | Nakanishi | 248/68.1 |
| 6,585,196 B2 * | 7/2003 | Nakanishi | 248/68.1 |
| 6,688,827 B2 * | 2/2004 | Gelb | 411/372.6 |
| 2004/0182973 A1 * | 9/2004 | Kawai | 248/71 |

FOREIGN PATENT DOCUMENTS

| | | | |
|---|---|---|---|
| JP | 0599662 A1 * | 6/1994 | |
| JP | 11-190324 | 7/1999 | |

* cited by examiner

FASTENERS FOR ATTACHING PIPES TO A SUPPORT

CROSS-REFERENCE TO RELATED APPLICATION

This application claims the benefit of Japanese Patent Application No. 2003-370668 filed Oct. 30, 2003, incorporated herein by reference.

BACKGROUND OF THE INVENTION

The present invention relates to improved fasteners for pipes such as fuel oil lines and brake fluid lines and, more specifically, to a fastener comprising a base, pipe fastening portions connected to the base, and a stud engaging portion connected to at least one of the base and the pipe fastening portions to engage a stud extending from a support, and in which pipes held by the pipe fastening portions are mounted on the support by coupling the stud engaging portion to the stud.

Fasteners for pipes such as fuel oil lines and brake fluid lines are well known. See, for example, Japanese Unexamined Utility Model Application Publication 60-73987 (Patent Document 1: corresponding to Examined Utility Model Application Publication 64-3891) disclosing a fastener comprising a base, pipe fastening portions connected to the base, and a stud engaging portion connected to either the base or the pipe fastening portions to engage a stud extending from a support. This fastener uses a bolt as the stud, and the stud engaging portion is strongly and easily screwed onto the stud using a power screwdriver. A cover is attached to the fastener to protect the fastened pipes.

Kokai 11-190324 (Patent Document 2) discloses a clamp attached to a stud bolt. This clamp can be used as a wire harness connector, and is mounted on a car body by engaging a stud bolt extending from the car body. An anti-noise cap is attached to the clamp at the end of the stud bolt to keep the clamp from generating noise.

A fastener for pipes such as fuel oil lines and brake fluid lines is disclosed in U.S. Pat. No. 6,450,459 (Patent Document 3), in which an electrical connection plate for establishing an electrical connection between pipes and the stud is formed on the back side of a base, and any charge stored in the pipes is discharged to a car body via the stud.

Pipe fasteners for mounting fuel oil lines and brake fluid lines using studs extending from car bodies are used on the floor of vehicles and in the engine compartment. In the engine compartment, for example, if the frame on which a stud extends outward is bent in a collision, the end of the stud may not only damage other parts of the car but may also rupture the adjacent fuel tank, causing a major disaster. To prevent this from happening, the end of the stud must be prevented from puncturing the fuel tank if the frame from which the stud extends is bent.

In the fastener disclosed in Patent Document 1, a cover is attached to protect the pipes, but prevention of fuel tank punctures from the end of the stud is not mentioned, and no consideration is given to fuel tank ruptures. The cover to the fastener in Patent Document 1, moreover, is attached after the stud engaging portion has been mounted on the stud, and cannot be attached to the fastener first. A cap is placed on the end of the stud to reduce noise in the clamp described in Patent Document 2, but no consideration is given to punctures by the end of the stud. An electrical connection plate is placed on the back side of the base in the fastener described in Patent Document 3 to allow the charge stored in the pipes to escape, but Patent Document 3 also does not teach preventing punctures by the end of the stud.

BRIEF DESCRIPTIONS OF THE INVENTION

An object of the present invention is to provide a fastener for a pipe that prevents the end of a stud to which the fastener is attached from puncturing a fuel tank or breaking other parts of a car body, for example.

In accordance with the present invention, a fastener comprises a base, pipe fastening portions connected to the base, and a stud engaging portion connected to at least one of the base and the pipe fastening portions to engage a stud extending from a support. The stud engaging portion has a stud receiving hole for receiving the stud. A protective member is attached to at least one of the stud engaging portion and the base to cover the end of a stud in the stud receiving hole. The protective member has sufficient rigidity to prevent the end of the stud from protruding out of the stud receiving hole due to a collision. The protective member is attached to the fastener before mounting the fastener on the stud, so the protective member does not have to be attached to the fastener on a vehicle assembly line, for example.

BRIEF DESCRIPTION OF THE DRAWINGS

The invention will be further described in connection with the accompanying drawings, which show preferred (best mode) embodiments, and wherein.

DETAILED DESCRIPTION OF THE INVENTION

In one embodiment of the invention, the protective member comprises a U-shaped metal plate attached along an outside surface of the base. In another embodiment of the fastener, the protective member comprises a U-shaped metal plate attached along an outside surface of the stud engaging portion and along an outside surface portion of the base connected to it. In yet another embodiment, the protective member is a metal plate inserted in the stud engaging portion adjacent to the stud end. In still another embodiment, the protective member is a metal plate molded in the stud engaging portion adjacent to the stud end.

Figure 3:
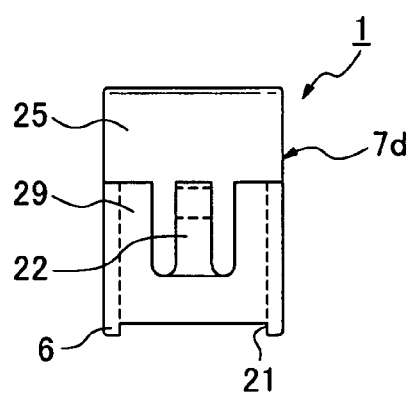
FIG. 3 is a right side view of the main body in FIG. 2.
Figure 4:
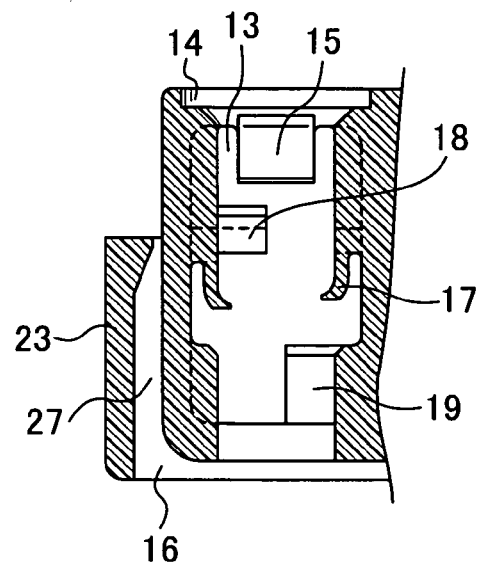
FIG. 4 is a cross-sectional view of the stud engaging portion of the main body in FIG. 1, along line 4-4 in FIG. 1.
Figure 5:
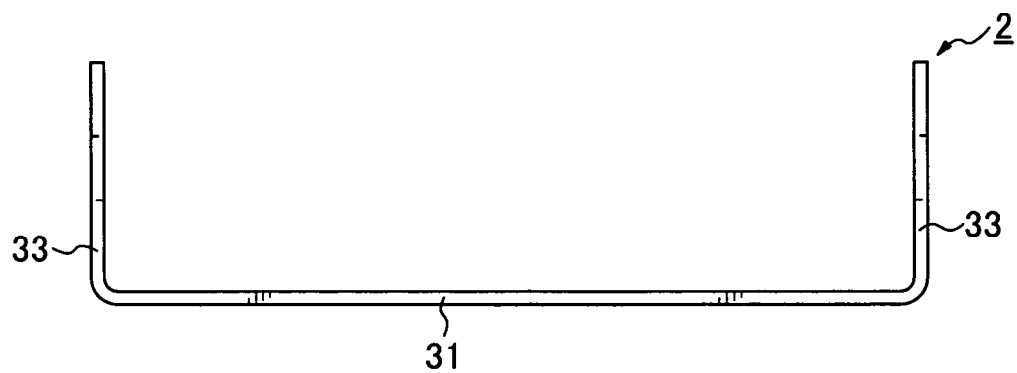
FIG. 5 is a front view of the protective member for the fastener in the first embodiment of the present invention.
Figure 6:
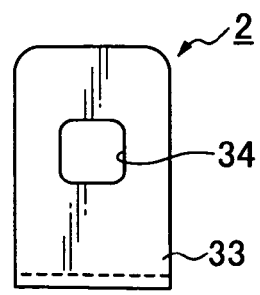
FIG. 6 is a side view of the protective member in FIG. 5.
Figure 7:
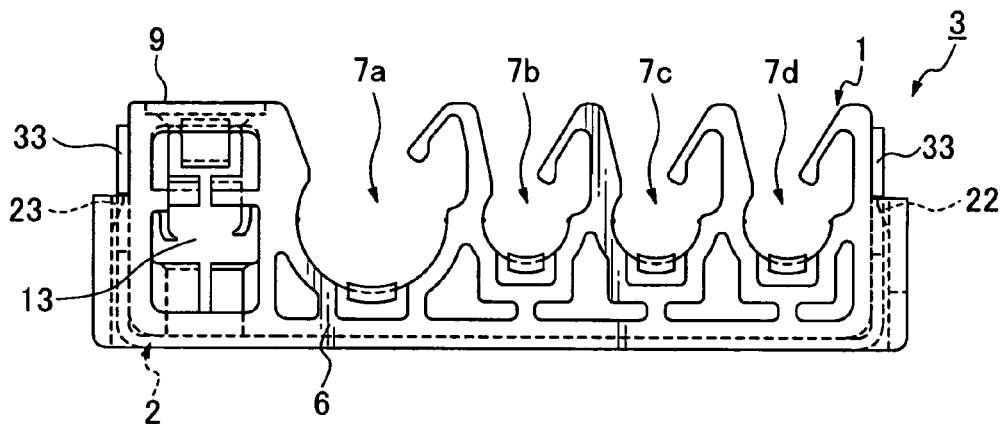
FIG. 7 is a front view of the fastener in the first embodiment of the present invention.
Figure 8:
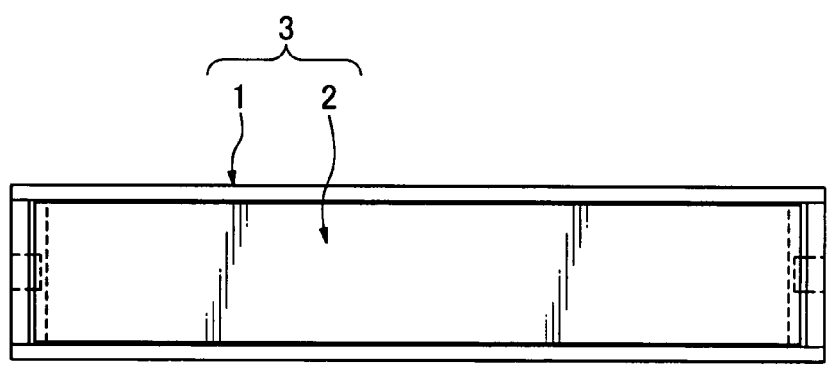
FIG. 8 is a bottom view of the fastener in FIG. 7.
Figure 9:
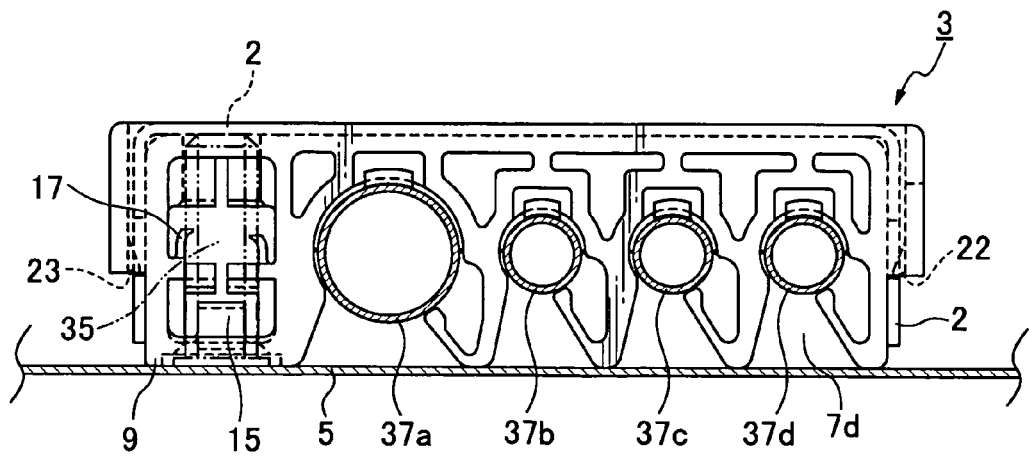
FIG. 9 is a front view of the fastener in the first embodiment of the present invention engaged with a stud protruding from a panel.

The following is an explanation of the fasteners for pipes in the embodiments of the present invention with reference to the drawings. FIG. 1 through FIG. 9 show the fastener in a first embodiment of the present invention. FIG. 1 through FIG. 4 show the fastener main body 1 before the protective member is attached. FIG. 5 and FIG. 6 show the protective member 2. FIG. 7 and FIG. 8 show the fastener 3 of the present invention with the protective member 2 attached to the fastener main body 1. FIG. 9 shows pipes mounted on a support such as the panel 5 of a car body using the fastener 3.

In FIG. 1 through FIG. 4, the fastener main body 1 is preferably an integrated molded product made of plastic. The base 6, pipe fastening portions 7a-7d, and stud engaging portion 9 for mounting to a support such as a panel 5 are molded so as to be integrated in the fastener main body 1. The pipe fastening portions 7a-7d are connected to the base 6 in parallel fashion so that pipes can be fastened to it in parallel fashion. The base itself is slender and extends lengthwise perpendicular to the pipes. The stud engaging portion 9 is connected to the base adjacent to pipe fastening portion 7a. The pipe fastening portions 7a-7d have housing portions 10 with curved bottom surfaces of different diameters so that pipes with different diameters, such as fuel oil lines and brake fluid lines, can be fastened. One sidewall of each of the housing portions 10 extends upwards to an elastic holding tab 11 having a tip bent at an angle towards the bottom of the housing portions 10 to apply pressure from above to side surfaces of fastened pipes.

The stud engaging portion 9 forms one of the sidewalls of pipe fastening portion 7a, and receives a stud or stud bolt extending from a panel for example. A stud receiving hole 13 extends axially in the stud engaging portion 9, and a pair of pawls 15 is formed near an entrance 14 of the hole. At a center position of the hole, another pair of pawls 17 is formed facing a direction perpendicular to pawls 15 to apply a strong engaging force on a stud.

The end of the stud engaging portion 9 opposite the entrance 14 in the axial direction is connected to the base 6, and is thus integrally and securely connected to the fastener main body 1. A pair of guides 18 is formed between the pawls 15 and the pawls 17 so as to define part of a first sidewall of the stud receiving hole. Another pair of guides 19 is formed from the base 6 towards the pawls 17 so as to define part of a second sidewall of the stud receiving hole. These guides ensure that a received stud is centered in the stud receiving hole and that the engagement force of the pawls is maintained properly and firmly.

A protective member 2 is attached to an outside bottom surface of the base 6, a side surface of the stud engaging section 9, and a side surface of pipe fastening portion 7d. As shown in FIG. 3, a groove 21 for accommodating the protective member 2 is formed along the entire bottom surface lengthwise with respect to the base 6 (in the direction perpendicular to the pipes). The depth of the groove is equal to the thickness of the protective member 2 so that it is flush with the bottom surface of the base 6 when the protective member is attached.

Figure 1:
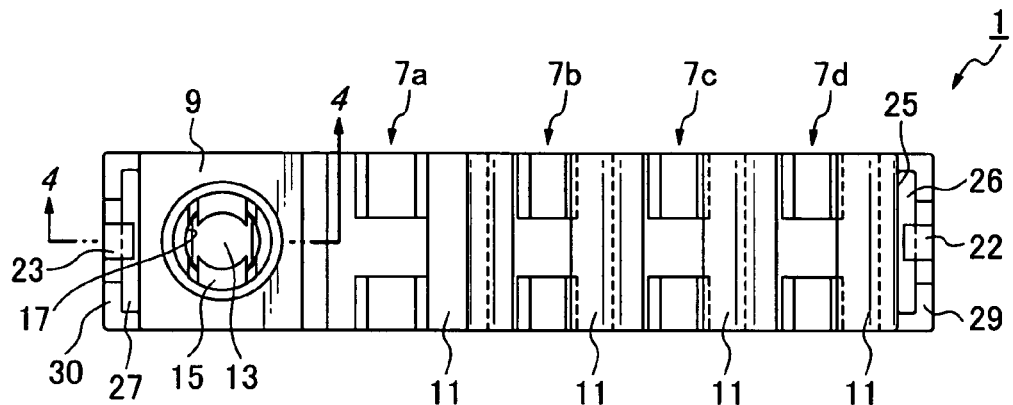
FIG. 1 is a plan view of the main body of the fastener in the first embodiment of the present invention.
Figure 2:
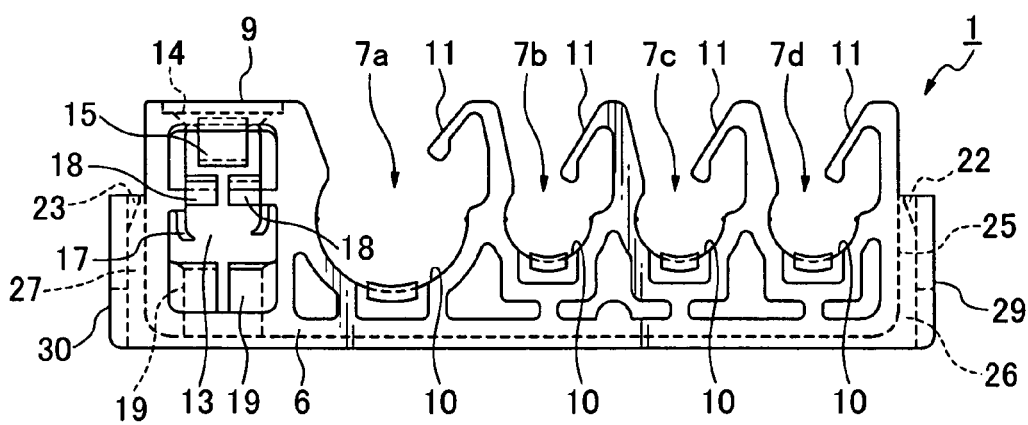
FIG. 2 is a front view of the main body in FIG. 1.

An elastic pawl 22 extends upwards from the bottom of the base 6 along a side surface of pipe fastening portion 7d. Also, as shown in FIG. 4, a second elastic pawl 23 extends upwards from the bottom of the base 6 on a side surface of the stud engaging portion 9. Pawls 22 and 23 can also be viewed in FIG. 1 and FIG. 2. As shown in FIG. 1 and FIG. 2, a passage 26 is formed between pawl 22 and the sidewall 25 of pipe fastening portion 7d to guide the protective member 2 into engagement with pawl 22. Also, as shown in FIG. 1 and FIG. 4, a passage 27 is formed between pawl 23 and the sidewall of stud engaging portion 9 to guide the protective member 2 into engagement with pawl 23. Because passages 26 and 27 ensure that pawls 22 and 23 engage the protective member 2 properly without any slippage to the outside, the engagement force is strong. To form passages 26 and 27, guide wall 29 and guide wall 30 protrude laterally on the sidewall 25 of pipe fastening portion 7d and the sidewall of the stud engaging portion 9.

The protective member 2 will now be explained with reference to FIG. 5 and FIG. 6. The protective member 2 is a U-shaped plate having enough rigidity to keep an end of a stud from protruding out of the stud receiving hole in the stud engaging portion 9. Metal, such as steel, can be made rigid enough for this purpose, but other acceptable materials for use in the protective member 2 include, for example, fiber-reinforced plastic (FRP) and other types of plastic. In FIG. 5, the length of the horizontal portion 31 corresponds to the length of the base 6, and the width shown in FIG. 6 corresponds to the width of the groove 21 in the bottom surface of the base 6. In FIG. 5, the two vertical portions 33 pass through passage 26 along the sidewall 25 of pipe fastening portion 7d and passage 27 along the sidewall of the stud engaging portion 9 in the fastener main body 1 to engage pawls 22 and 23. The vertical portions 33 are taller than pawls 22 and 23, and engaging holes 34 are formed in the vertical portions at the positions corresponding to pawls 22 and 23.

FIG. 7 and FIG. 8 show the fastener 3 with the protective member 2 attached to the fastener main body 1. The horizontal portion 31 of the protective member 2 is fixed along the groove 21 in the bottom surface of the fastener main body 1, so as to be flush with the bottom surface of the base 6. The two vertical portions 33 of the protective member 2 are inserted into passage 26 along the sidewall 25 of pipe fastening portion 7d and passage 27 along the sidewall of stud engaging portion 9. Once so inserted, pawls 22 and 23 engage the engaging holes 34. The protective member 2 is attached to the fastener main body 1 in this way so that it covers an end of the stud received in the stud receiving hole 13 in the stud engaging portion 9, and keeps the end of the stud from coming out of the receiving hole even if the panel from which the stud extends is bent in a collision. The vertical portions 33 of the protective member 2 are restrained by passages 26 and 27 formed by guide walls 29 and 30 from slipping to the outside. Because the restrained vertical portions 33 engage pawls 22 and 23, the force with which the protective member 2 engages the fastener main body 1 is strong, and can resist the force of the end of the stud coming out of the receiving hole in a collision.

FIG. 9 shows fastener 3 with pipes 37a-37d fastened to the pipe fastening portions 7a-7d mounted on a panel 5 via a stud (bolt) 35 extending from the panel 5. The stud 35 is inserted into the stud engaging portion 9, engaging pawls 15 and 17 with grooves or threads in the stud 35, and the pipes 37a-37d held by the fastener 3 are mounted on the panel 5. When the panel 5 is a frame in an engine compartment, the protective member 2 can prevent the stud from coming out of the receiving hole due to a bending of the frame in a collision. As a result, major disasters can be avoided.

Figure 12:
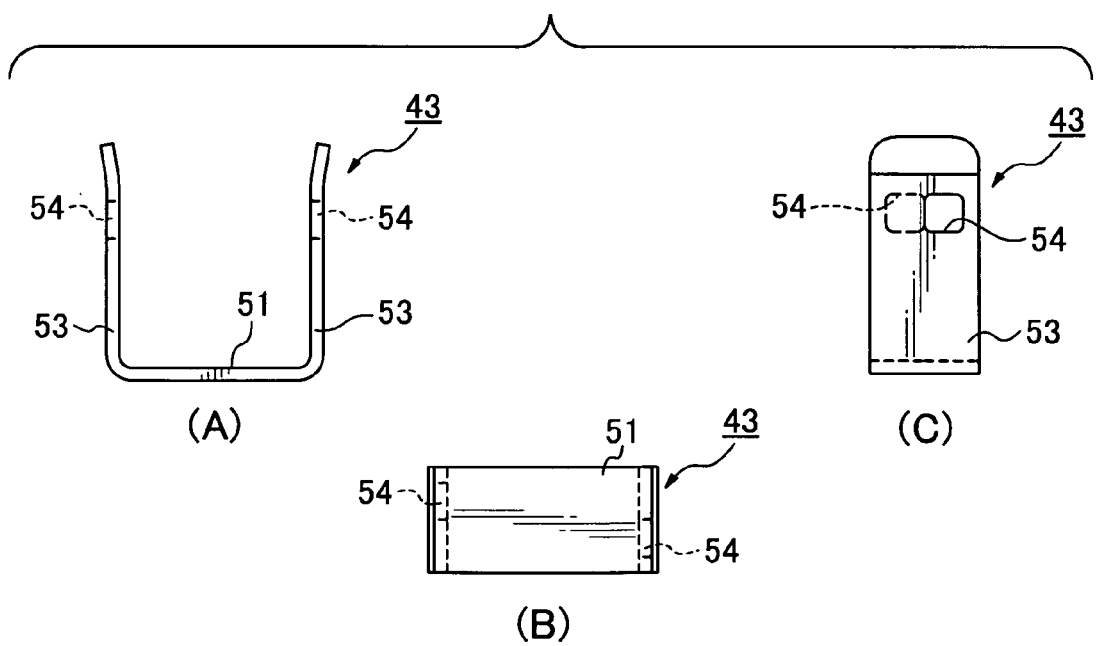
FIG. 12 is comprised of views of the protective member for the fastener in the second embodiment of the present invention, in which (A) is a front view of the protective member, (B) is a bottom view of the protective member, and (C) is a right side view of the protective member.
Figure 13:
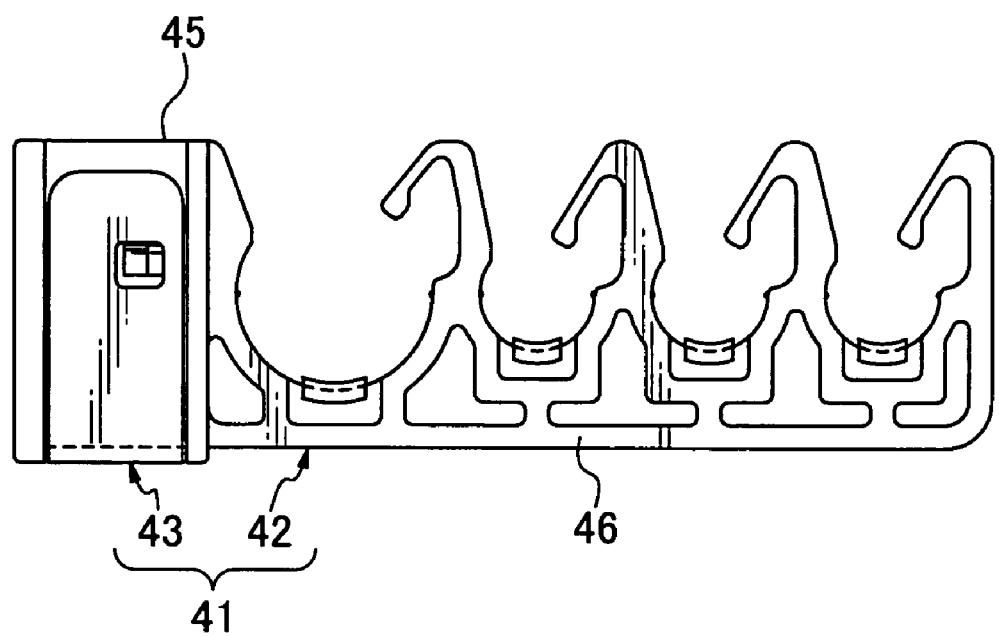
FIG. 13 is a front view of the fastener in the second embodiment of the present invention.
Figure 14:
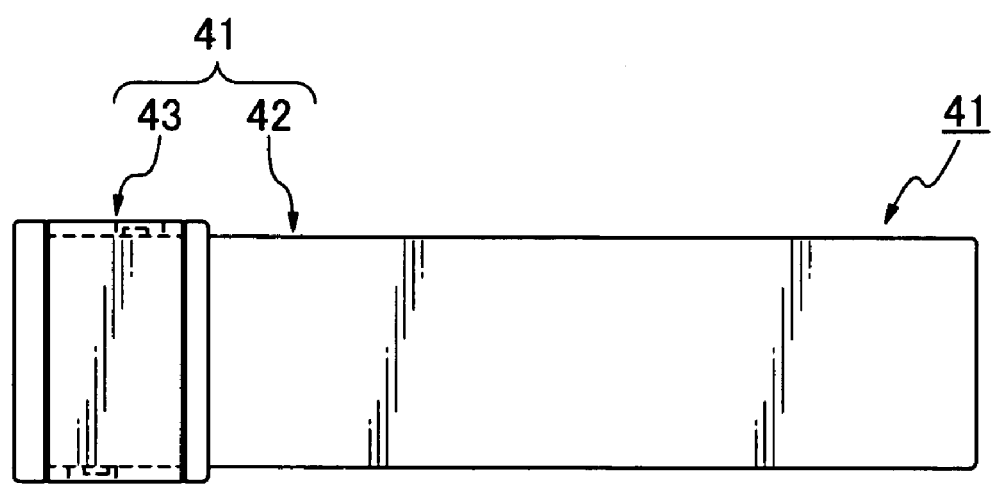
FIG. 14 is a bottom view of the fastener in FIG. 13.

FIG. 10 through FIG. 14 show the fastener 41 in the second embodiment. This fastener 41 comprises the fastener main body 42 shown in FIG. 10 and FIG. 11, and the protective member 43 shown in FIG. 12. The protective member 43 is attached to the fastener main body 42 as shown in FIG. 13 and FIG. 14. This fastener 41 differs from the fastener 3 in the first embodiment in that the protective member 43 is attached crosswise with respect to the length of the base 46 along outside surfaces of the stud engaging portion 45 of the fastener main body 42 and a section of the outside surface of the base connected to it. In other respects, the fastener 41 is identical to fastener 1, so further explanation of these aspects has been omitted.

Figure 10:
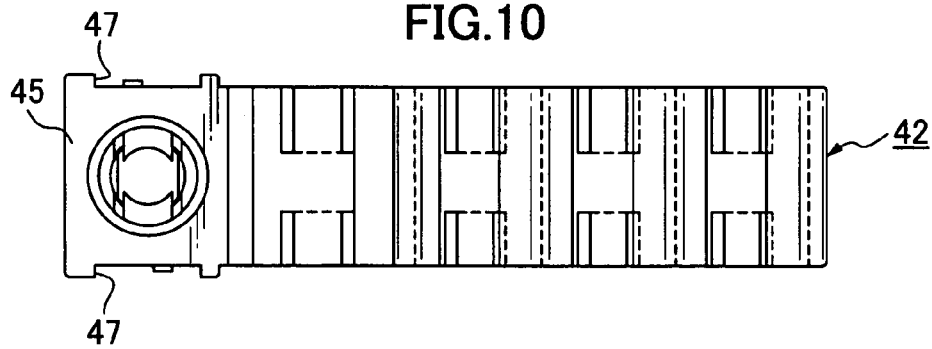
FIG. 10 is a plan view of the main body of the fastener in the second embodiment of the present invention.
Figure 11:
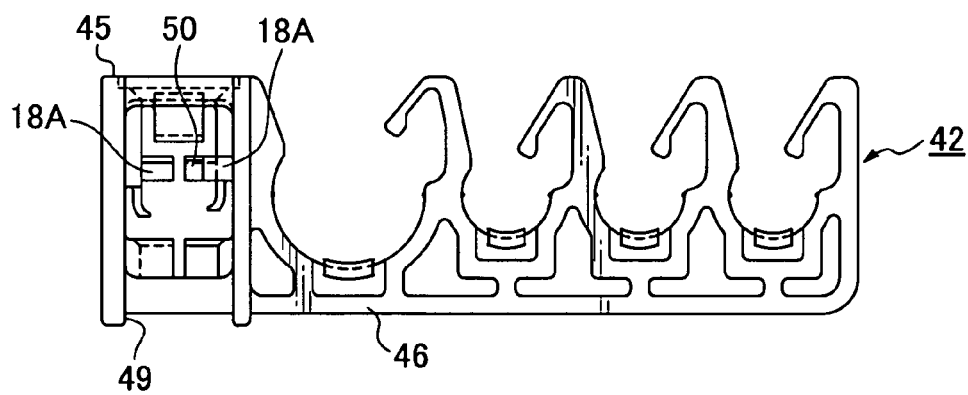
FIG. 11 is a front view of the main body in FIG. 10.

As shown in FIG. 10, a groove 47 is formed in both the front and back side surfaces of the stud engaging portion 45 to receive the protective member 43. A groove 49 for receiving the protective member 43 is formed in the bottom surface of the stud receiving portion 45 and the portion of the base 46 connected to it. Also, engaging portions 50 for engagement with engaging holes in the protective member 43 are formed in the two guides 18A (the front guide 18A can be viewed in FIG. 11) midway up the stud engaging portion 45 where the stud receiving hole is formed.

As shown in FIG. 12(A) through (C), the protective member 43 is a U-shaped plate (e.g., of metal) having enough rigidity to keep the end of the stud from protruding out of the stud receiving hole. In FIG. 12, the length of the horizontal portion 51 corresponds to the width of the stud engaging portion 45, and the width of the portion 51 corresponds to the width of grooves 47 and 49. The two vertical portions 53 engage the engaging portions 50 of the guide grooves 18A in the stud engaging portion 45. The vertical portions 53 have nearly the same height as the stud engaging portion 45, and engaging holes 54 are formed in (the two) positions corresponding to the engaging portions 50.

FIG. 13 and FIG. 14 show the fastener 41 with the protective member 43 attached to the fastener main body 42. The protective member 43 is inserted into the grooves 47 and 49 along outside surfaces of the stud engaging portion 45 and part of the outside surface of the base 46 connected to it, so that the portion 51 is flush with the bottom surface of the base 46. The engaging holes 54 in the two vertical portions 53 of the protective member 2 engage the engaging portions 50 of the stud engaging portion 45, and the protective member 43 covers the end of the stud received by the stud receiving hole of the stud engaging portion 45. In this way, the protective member 43 is attached so that the engaging holes 54 in the vertical portions 53 engage the engaging portions 50 of the stud engaging portion 45. Guides for keeping the vertical portions 53 from slipping to the outside can be formed on the outside of the stud engaging portion as in the first embodiment. When the fastener 41 is attached to a stud extending from a frame in an engine compartment, for example, the protective member 43 can prevent the stud from coming out of the receiving hole due to bending of the frame in a collision. As a result, major disasters can be avoided.

Figure 15:
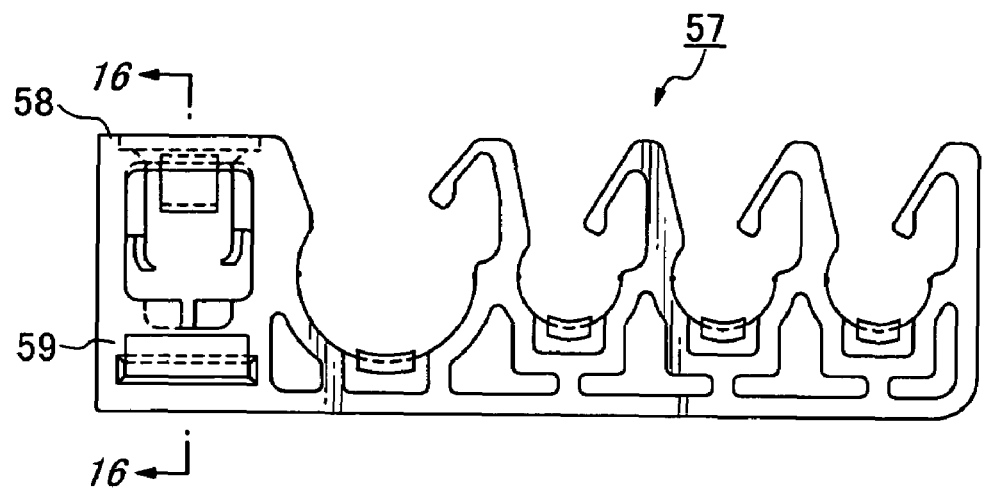
FIG. 15 is a front view of the fastener in the third embodiment of the present invention.
Figure 16:
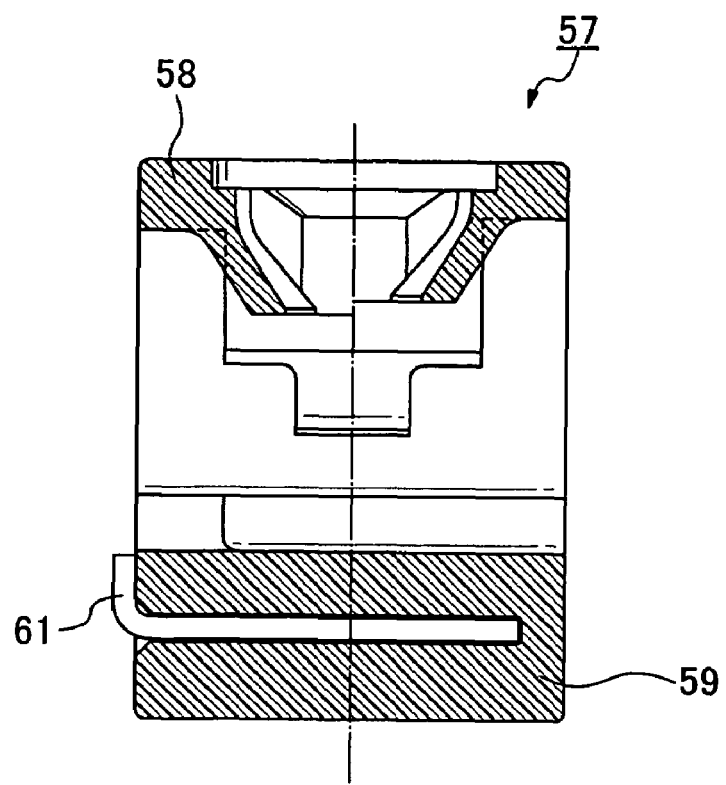
FIG. 16 is a cross-sectional view along line 16-16 in FIG. 15.

FIG. 15 and FIG. 16 show the fastener 57 in the third embodiment. In this fastener 57, the protective member 61 is a plate (e.g., metal) pressed into a slot in a stud end side portion 59 of the stud engaging portion 58. In other respects, the fastener 57 is identical to fastener 1 so an explanation of these aspects has been omitted.

As shown in FIG. 15 and FIG. 16, a slot for receiving the protective member 61 is formed in the stud end side portion 59 of the stud engaging portion 58, and the protective member 61 is attached by insertion in the slot, using pressure thereon from a hammer or some other tool. The protective member 61 keeps the stud from protruding outward and damaging car parts such as an adjacent fuel tank due to bending of the frame in a collision.

Figure 17:
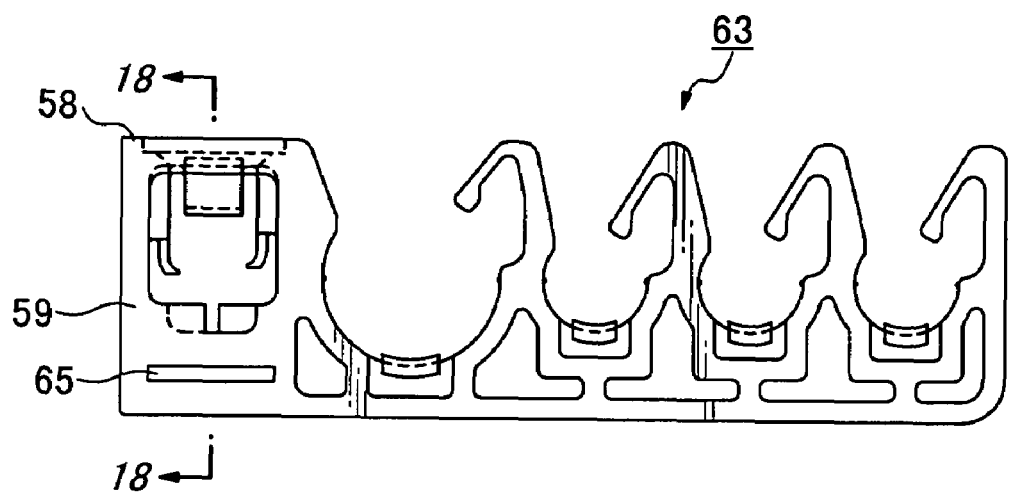
FIG. 17 is a front view of the fastener in the fourth embodiment of the present invention.
Figure 18:
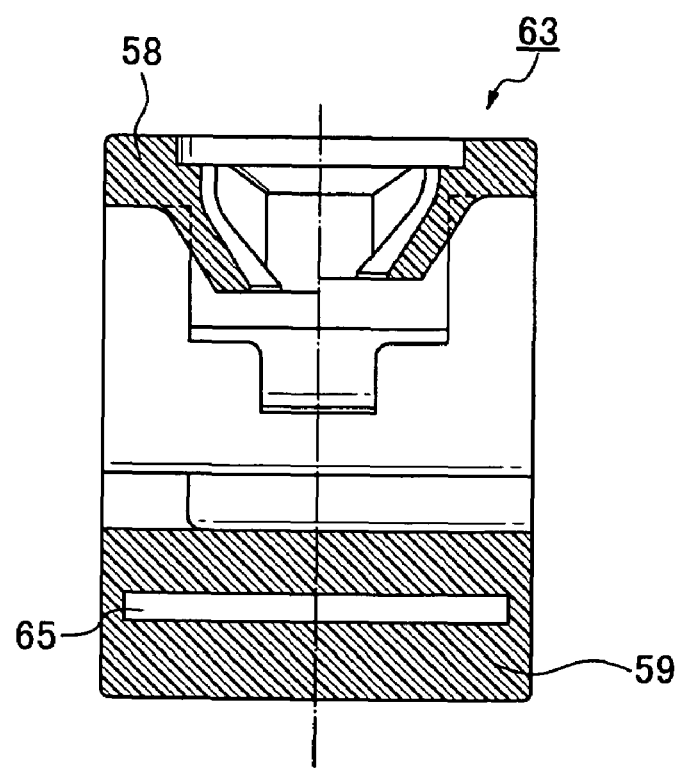
FIG. 18 is a cross-sectional view along line 18-18 in FIG. 17.

FIG. 17 and FIG. 18 show the fastener 63 in the fourth embodiment. In this fastener 63, the protective member 65 is a plate (e.g., metal) attached using insert molding to the stud end side portion 59 of the stud engaging portion 58. In other respects, the fastener 63 is identical to fastener 57 so an explanation of these aspects has been omitted. As shown in FIG. 17 and FIG. 18, the protective member 65 is on the stud end side portion 59 of the stud engaging portion 58. The protective member 65 keeps the stud from protruding outward and damaging car parts such as an adjacent fuel tank due to bending of the frame in a collision.

While preferred embodiments of the invention have been shown and described, it will be apparent that changes can be made without departing from the principles and spirit of the invention, the scope of which is defined in the following claims.

What is claimed is:

1. A fastener comprising a unitary main body, having, as integral portions thereof, permanently affixed to each other, a base portion, an elongated object fastening portion, and a stud engaging portion having a stud receiving hole with an entrance at one end of the stud engaging portion for receiving a stud and with a pawl in the hole for engaging a stud in the hole; and
   a protective member attached to the main body,
   wherein the protective member comprises a U-shaped plate with a planar base forming the bottom of the U-shaped plate and attached to the main body along a bottom surface of the base portion of the main body, and with legs of the U-shaped plate extending in a direction substantially perpendicular to the planar base of the U-shaped plate from opposite ends of the planar base and attached to the main body along opposite end surfaces of the main body,
   wherein the protective member covers an end of the stud engaging portion opposite to the entrance of the stud receiving hole and blocks a stud in the stud receiving hole from protruding from the base portion of the main body, and
   wherein the main body has passages extending openly and upwardly from the bottom surface of the base portion of the main body at opposite ends of the base portion of the main body, and the U-shaped plate has its legs extending upwardly in the respective passages and its planar base contiguous with the bottom surface of the base portion of the main body.

2. A fastener according to claim 1, wherein the bottom surface of the base portion of the main body provides a groove that receives the planar base of the U-shaped plate, and the passages have pawls that enter openings in the respective legs of the U-shaped plate to attach the protective member to the main body.

3. A fastener comprising a unitary main body, having, as integral portions thereof, permanently affixed to each other, a base portion, an elongated object fastening portion, and a stud engaging portion having a stud receiving hole with an entrance at one end of the stud engaging portion for receiving a stud and with a pawl in the hole for engaging a stud in the hole; and a protective member attached to the main body, wherein the protective member comprises a U-shaped plate with a planar base forming the bottom of the U-shaped plate and attached to the main body along a bottom surface of the base portion of the main body beneath the stud engaging portion, and with legs of the U-shaped plate extending in a direction substantially perpendicular to the planar base of the U-shaped plate from opposite ends of the planar base and attached to the main body along opposite side surfaces of the stud engaging portion, wherein sides of the stud engaging portion provide grooves receiving respective legs of the U-shaped plate, wherein the sides of the stud engaging portion and the legs of the U-shaped plate have cooperable elements that retain the U-shaped plate on the stud-engaging portion, and wherein the protective member covers an end of the stud engaging portion opposite to the entrance of the stud receiving hole and blocks a stud in the stud receiving hole from protruding through the base portion of the main body.

4. A fastener according to claim 3, wherein a bottom of the stud engaging portion provides a groove receiving the planar base of the U-shaped plate.

5. A fastener comprising a unitary main body, having, as integral portions thereof, permanently affixed to each other, a base portion, an elongated object fastening portion, and a stud engaging portion having a stud receiving hole with an entrance at one end of the stud engaging portion for receiving a stud and with a pawl in the hole for engaging a stud in the hole; and a protective member attached to the main body, wherein the protective member is a plate extending in a slot leading from a side of the stud engaging portion below an end of the stud receiving hole opposite to the entrance and blocks a stud in the stud receiving hole from protruding through the base portion of the main body.

* * * * *